US011885656B2

(12) United States Patent
Ishida et al.

(10) Patent No.: US 11,885,656 B2
(45) Date of Patent: Jan. 30, 2024

(54) FLOW-RATE MEASURING APPARATUS CAPABLE OF ACCURATELY MEASURING FLOW RATE OF FLUID WITH REFLECTING VISCOSITY OF FLUID

(71) Applicant: OMRON Corporation, Kyoto (JP)

(72) Inventors: Yui Ishida, Nara (JP); Naoki Yoshitake, Kusatsu (JP); Yoshitaka Tsurukame, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 235 days.

(21) Appl. No.: 17/274,972

(22) PCT Filed: Mar. 14, 2019

(86) PCT No.: PCT/JP2019/010625
§ 371 (c)(1),
(2) Date: Mar. 10, 2021

(87) PCT Pub. No.: WO2020/183720
PCT Pub. Date: Sep. 17, 2020

(65) Prior Publication Data
US 2022/0057243 A1 Feb. 24, 2022

(51) Int. Cl.
*G01F 1/667* (2022.01)
*G01F 25/10* (2022.01)
(Continued)

(52) U.S. Cl.
CPC .............. *G01F 1/668* (2013.01); *G01F 1/662* (2013.01); *G01F 25/10* (2022.01); *G01N 11/04* (2013.01)

(58) Field of Classification Search
CPC .......... G01F 1/668; G01F 1/662; G01F 25/10; G01F 1/667; G01N 11/04; G01N 2011/0073
(Continued)

(56) References Cited

U.S. PATENT DOCUMENTS

| 5,365,778 | A | 11/1994 | Sheen et al. |
| 5,546,813 | A | 8/1996 | Hastings et al. |
| 9,816,848 | B2 | 11/2017 | Raykhman et al. |

(Continued)

FOREIGN PATENT DOCUMENTS

| EP | 0352203 A2 * | 1/1990 | |
| GB | 2481831 A * | 1/2012 | ............... G01N 9/24 |

(Continued)

OTHER PUBLICATIONS

EPO Extended European Search Report for corresponding EP Application No. 19918915.0; dated Feb. 18, 2022.
(Continued)

*Primary Examiner* — Marrit Eyassu
(74) *Attorney, Agent, or Firm* — CANTOR COLBURN LLP (57) ABSTRACT

A flow-rate measuring apparatus transmits a first measurement signal having at least one first frequency by a first transducer, and receives the first measurement signal by a second transducer through a fluid inside a pipe. The flow-rate measuring apparatus determines a second frequency based on the first measurement signal. The flow-rate measuring apparatus transmits a second measurement signal having the second frequency by a third transducer toward an interface between the pipe and the fluid, and receives the second measurement signal reflected at the interface by a fourth transducer. The flow-rate measuring apparatus calcu-
(Continued)

lates a flow rate of the fluid inside the pipe so as to reflect a viscosity of the fluid based on the first and second measurement signals.

7 Claims, 9 Drawing Sheets

(51) Int. Cl.
  *G01F 1/66* (2022.01)
  *G01N 11/04* (2006.01)
(58) Field of Classification Search
  USPC .......................................................... 73/1.16
  See application file for complete search history.

(56) References Cited

U.S. PATENT DOCUMENTS

| | | | | |
|---|---|---|---|---|
| 2009/0266165 | A1* | 10/2009 | Greenwood | ......... G01N 29/221 |
| | | | | 73/597 |
| 2016/0041286 | A1 | 2/2016 | Sinha et al. | |
| 2019/0154480 | A1* | 5/2019 | Schöb | ..................... G01F 15/02 |

FOREIGN PATENT DOCUMENTS

| | | | | | |
|---|---|---|---|---|---|
| JP | 2004264064 | A | * | 9/2004 | ............. G01F 1/662 |
| JP | 2010261873 | A | | 11/2010 | |
| JP | 5282955 | B2 | | 9/2013 | |
| JP | 5608884 | B2 | | 11/2014 | |
| RU | 66029 | U1 | * | 8/2007 | |
| RU | 66029 | U1 | | 8/2007 | |

OTHER PUBLICATIONS

Mylvaganam K S: "High-Rangeability Ultrasonic Gas Flowmeter for Monitoring Flare Gas", IEEE Transactions on Ultrasonics,Ferroelectrics, and Frequesncy Control, IEEE, USA, vol. 36, No. 2, Mar. 1, 1989 (Mar. 1, 1989), pp. 144-149.
PCT Written Opinion of the International Searching Authority for International Application No. PCT/JP2019/010625; dated Jun. 11, 2019.
International Search Report for International Application No. PCT/JP2019/010625; dated Jun. 11, 2019.

* cited by examiner

FLOW-RATE MEASURING APPARATUS CAPABLE OF ACCURATELY MEASURING FLOW RATE OF FLUID WITH REFLECTING VISCOSITY OF FLUID

CROSS REFERENCE TO RELATED APPLICATIONS

This is the U.S. national stage of application No. PCT/JP2019/010625, filed on Mar. 14, 2019. Priority of which is claimed and the disclosure of which is also incorporated herein by reference.

TECHNICAL FIELD

The present disclosure relates to a flow-rate measuring apparatus for measuring a flow rate of a fluid inside a pipe having a predetermined cross-sectional area.

BACKGROUND ART

In order to obtain a flow rate of a fluid inside a pipe, it is known to measure the velocity of the fluid by transmitting a measurement signal, such as an ultrasonic wave, through the fluid. The velocity of the fluid obtained from such a measurement signal is the velocity in only a partial region of the pipe. However, a velocity distribution of the fluid across a cross section of the pipe varies dependent on a viscosity (or kinematic viscosity) of the fluid. Therefore, in order to accurately measure the flow rate of the fluid, it is necessary to consider the viscosity (or kinematic viscosity) of the fluid.

For example, Patent Documents 1 and 2 disclose measuring a flow rate of a fluid inside a pipe in consideration of a kinematic viscosity of the fluid.

Patent Document 1 discloses an ultrasonic flowmeter which transmits and receives ultrasonic waves using a plurality of ultrasonic transceivers provided in a pipe at measurement sites having different cross-sectional areas of a channel, or having different roughness in an inner surface, measures flow velocities or flow rates of a measurement fluid using the plurality of ultrasonic transceivers, respectively, and corrects the flow rate of the measurement fluid based on ratios or differences among the measurements. As a result, the flow rate is accurately corrected even when a type or concentration of the measurement fluid varies.

Patent Document 2 discloses an ultrasonic flowmeter which stores flow-rate correction data for a plurality of types of fluids, the data defining relationships among sound velocity, density, and kinematic viscosity coefficient of each type of fluids, and identifies a type of fluid flowing through a pipe based on the data, a sound velocity of the fluid calculated by an acoustic parameter calculator, and a density of the fluid calculated by a density calculator. As a result, the type of fluid is identified, and the flow rate is accurately corrected based on the type of the fluid.

CITATION LIST

Patent Documents

PATENT DOCUMENT 1: Japanese Patent No. JP 5282955 B

PATENT DOCUMENT 2: Japanese Patent No. JP 5608884 B

SUMMARY OF INVENTION

Technical Problem

However, the ultrasonic flowmeter of Patent Document 1 requires a pipe (duct) having a special shape, in order to provide the plurality of ultrasonic transceivers on the pipe at the measurement sites having different cross-sectional areas of the channel, or having different roughness in the inner surface. As a result, it is difficult to measure a flow rate of a fluid inside an existing pipe. In addition, it is difficult to measure a flow rate of a fluid when there is not enough space to provide a pipe having a special shape. Therefore, there is a demand for a flow-rate measuring apparatus capable of measuring a flow rate of a fluid without requiring a pipe having a special shape.

In addition, the ultrasonic flowmeter of Patent Document 2 requires to store in advance the flow-rate correction data for a plurality of types of fluids, the data defining relationships among sound velocity, density, and kinematic viscosity coefficient of each type of fluids. As a result, it is not possible to obtain the kinematic viscosity of the fluid whose flow-rate correction data is not provided, and the accuracy of the measured flow rate degrades. Therefore, there is a demand for a flow-rate measuring apparatus capable of measuring a flow rate of a fluid, without requiring a predetermined table indicating relationships among viscosity and other parameters.

An object of the present invention is to provide a flow-rate measuring apparatus capable of accurately measuring a flow rate of a fluid with reflecting a viscosity of the fluid, without requiring a pipe having a special shape, and without requiring a predetermined table indicating relationships among the viscosity and other parameters.

Solution to Problem

According to an aspect of the present disclosure, a flow-rate measuring apparatus is provided for measuring a flow rate of a fluid inside a pipe having a predetermined cross-sectional area. The flow-rate measuring apparatus is connected to first to fourth transducers provided on the pipe, the first and third transducers converting electrical signals into acoustic signals, the second and fourth transducers converting acoustic signals into electrical signals. The flow-rate measuring apparatus is configured to transmit a first measurement signal having at least one first frequency by the first transducer, and receive the first measurement signal by the second transducer through the fluid inside the pipe. The flow-rate measuring apparatus is further configured to determine a second frequency based on the first measurement signal. The flow-rate measuring apparatus is further configured to transmit a second measurement signal having the second frequency by the third transducer toward an interface between the pipe and the fluid, and receive the second measurement signal reflected at the interface by the fourth transducer. The flow-rate measuring apparatus is further configured to calculate the flow rate of the fluid inside the pipe so as to reflect a viscosity of the fluid based on the first and second measurement signals.

Thus, it is possible to accurately measure the flow rate of the fluid with reflecting the viscosity of the fluid, without requiring a pipe having a special shape, and without requiring a predetermined table indicating relationships among the viscosity and other parameters.

According to the flow-rate measuring apparatus of the aspect of the present disclosure, the flow-rate measuring apparatus is further configured to calculate a first velocity of the fluid based on the first measurement signal. The flow-rate measuring apparatus is further configured to calculate a shear rate of the fluid based on the first velocity of the fluid. The flow-rate measuring apparatus is further configured to determine the second frequency so as to be proportional to the shear rate of the fluid.

Thus, it is possible to set the second frequency optimum for measuring the viscosity of the fluid, and thus, accurately measure the viscosity of the fluid, and therefore, accurately measure the flow rate of the fluid.

According to the flow-rate measuring apparatus of the aspect of the present disclosure, the flow-rate measuring apparatus is further configured to calculate a first velocity of the fluid based on the first measurement signal. The flow-rate measuring apparatus is further configured to calculate a reflectance at the interface between the pipe and the fluid based on the second measurement signal, and calculate the viscosity of the fluid based on the reflectance. The flow-rate measuring apparatus is further configured to correct the first velocity of the fluid based on the viscosity of the fluid to calculate a second velocity of the fluid. The flow-rate measuring apparatus is further configured to calculate the flow rate of the fluid inside the pipe based on the second velocity.

Thus, it is possible to accurately measure the flow rate of the fluid with reflecting the viscosity of the fluid.

According to the flow-rate measuring apparatus of the aspect of the present disclosure, the flow-rate measuring apparatus is further configured to calculate a Reynolds number of the fluid based on the viscosity of the fluid. The flow-rate measuring apparatus is further configured to determine whether the fluid is laminar or turbulent, based on the Reynolds number. The flow-rate measuring apparatus is further configured to calculate the second velocity of the fluid by multiplying the first velocity of the fluid by a correction coefficient of a laminar flow or a correction coefficient of a turbulent flow.

Thus, it is possible to appropriately correct the velocity of the fluid depending on whether the fluid is turbulent or laminar According to the flow-rate measuring apparatus of the aspect of the present disclosure, the first measurement signal has a plurality of frequencies, and the second measurement signal has a single frequency.

Thus, the first measurement signal is less likely to be masked by noises as compared with a case of using a single frequency signal.

According to the flow-rate measuring apparatus of the aspect of the present disclosure, the first measurement signal has a frequency varying with respect to time from a head portion of the first measurement signal.

Thus, the first measurement signal is less likely to be masked by noises as compared with a case of using a single frequency signal or a short signal.

According to the flow-rate measuring apparatus of the aspect of the present disclosure, the flow-rate measuring apparatus is connected to one transducer that operates as the third and fourth transducers.

Thus, it is possible to reduce the time and effort for arranging the transducers in the pipe.

According to the flow-rate measuring apparatus of the aspect of the present disclosure, the flow-rate measuring apparatus is connected to one transducer that operates as the first, third, and fourth transducers.

Thus, it is possible to reduce the time and effort for arranging the transducers in the pipe.

Advantageous Effects of Invention

According to the flow-rate measuring apparatus of one aspect of the present disclosure, it is possible to accurately measure the flow rate of the fluid with reflecting the viscosity of the fluid, without requiring a pipe having a special shape, and without requiring a predetermined table indicating relationships among the viscosity and other parameters.

DESCRIPTION OF EMBODIMENTS

Hereinafter, an embodiment according to one aspect of the present disclosure (hereinafter, also referred to as "the present embodiments") will be described with reference to the drawings. In the drawings, the same reference sign indicates similar components.

Application Example

Figure 1:
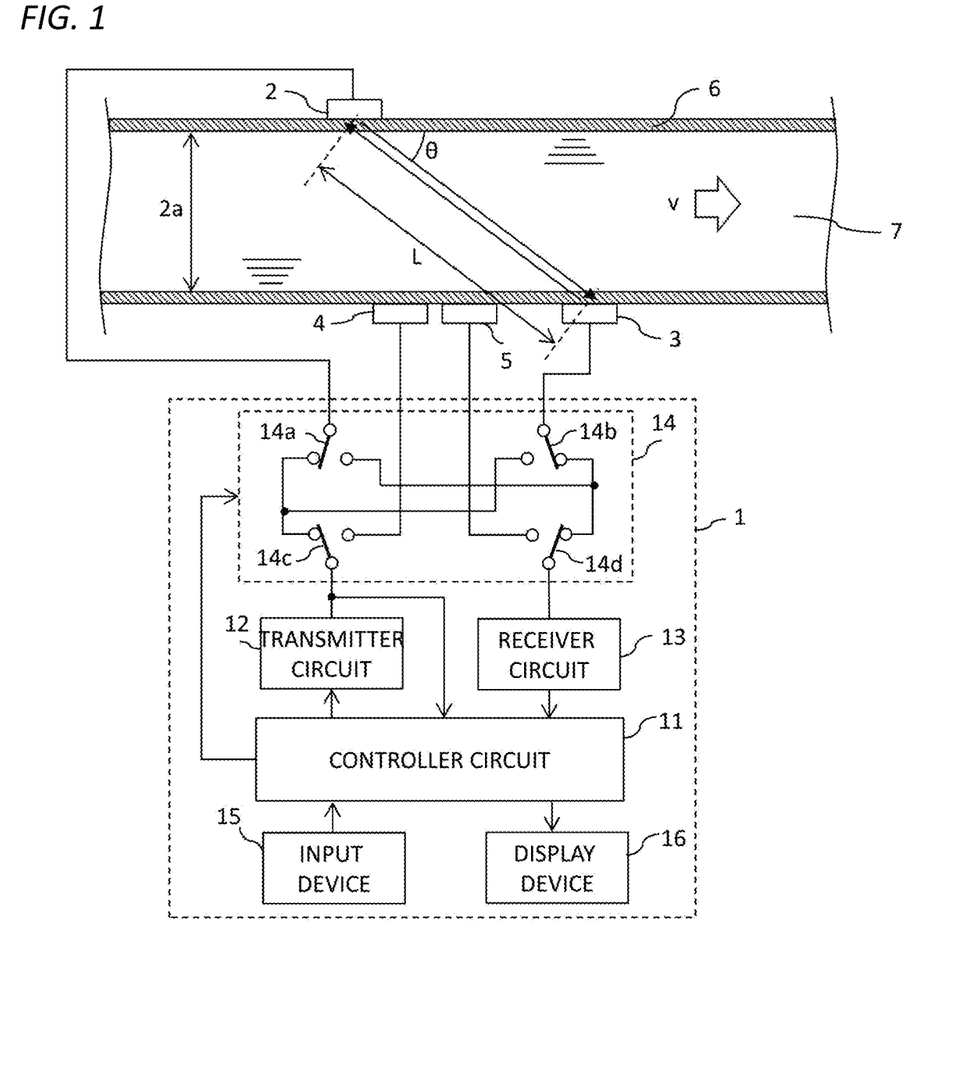
FIG. 1 is a block diagram illustrating a configuration of a flow-rate measuring apparatus 1 according to an embodiment.

FIG. 1 is a block diagram illustrating a configuration of a flow-rate measuring apparatus 1 according to an embodiment.

The flow-rate measuring apparatus 1 measures a flow rate of a fluid 7 inside a pipe 6 having a predetermined cross-sectional area. The fluid 7 may be a liquid or a gas. FIG. 1 illustrates a case where the pipe 6 has a circular cross section with an inner diameter of 2a, but not limited thereto, the pipe 6 may have any shaped cross section.

The flow-rate measuring apparatus 1 is connected to transducers 2 to 5 provided on the pipe 6, the transducers 2 and 4 converting electrical signals into acoustic signals, the transducers 3 and 5 converting acoustic signals into electrical signals. The transducers 2 to 5 are provided external to the pipe 6. The transducers 2 and 3 are provided on the pipe 6 so as to have a distance L from each other, and such that a straight line passing through the transducers 2 and 3 has an angle θ with respect to the longitudinal direction of the pipe 6 (for example, an inner surface of the pipe 6). The transducers 4 and 5 are provided close to each other.

One transducer may be used as both the transducers 2 and 4. Alternatively, one transducer may be used as both the transducers 3 and 5.

Each of the transducers 2 and 3 may convert an electrical signal and an acoustic signal into each other. The transducers 2 and 3 may be, for example, ultrasonic transducers converting an electrical signal and an ultrasonic signal into each other. The transducers 2 and 3 may be, for example, piezoelectric elements. In addition, each of the transducers 2 and 3 may be a combination of a transducer converting an electrical signal into an acoustic signal, and a transducer converting an acoustic signal into an electrical signal, which are arranged close to each other.

The flow-rate measuring apparatus 1 transmits a first measurement signal M1 having at least one first frequency by the transducer 2 (or 3), and receives the first measurement signal M1 by the transducer 3 (or 2) through the fluid 7 inside the pipe 6. The flow-rate measuring apparatus 1 determines a second frequency based on the first measurement signal M1. The flow-rate measuring apparatus 1 transmits a second measurement signal M2 having the second frequency by the transducer 4 toward an interface between the pipe 6 and the fluid 7, and receives the second measurement signal M2 reflected at the interface by the transducer 5. The flow-rate measuring apparatus 1 calculates a flow rate of the fluid 7 inside the pipe 6 so as to reflect a viscosity of the fluid 7 based on the first measurement signal M1 and the second measurement signal M2.

The viscosity of the fluid 7 can be calculated from a reflectance at the interface between the pipe 6 and the fluid 7, as described below. Therefore, the flow-rate measuring apparatus 1 can calculate the viscosity of the fluid 7 based on the second measurement signal M2, and calculate the flow rate of the fluid 7 so as to reflect the viscosity of the fluid 7. Since the viscosity of the fluid 7 is calculated from the second measurement signal M2, it is possible to measure the flow rate of the fluid 7 using the transducers 2 to 5 provided on the pipe 6 having an arbitrary shape, without requiring a pipe having a special shape. In addition, since the viscosity of the fluid 7 is calculated from the second measurement signal M2, it is possible to measure the flow rate of the fluid 7 without requiring a predetermined table indicating relationships among the viscosity and other parameters. Thus, according to the flow-rate measuring apparatus 1 of the embodiment, it is possible to accurately measure the flow rate of the fluid 7 with reflecting the viscosity of the fluid 7, without requiring a pipe having a special shape, and without requiring a predetermined table indicating relationships among the viscosity and other parameters.

In the present specification, one of the transducers 2 and 3 is also referred to as a "first transducer", and the other of the transducers 2 and 3 is also referred to as a "second transducer". In addition, in the present specification, the transducer 4 is also referred to as a "third transducer", and the transducer 5 is also referred to as a "fourth transducer".

Embodiment

The flow-rate measuring apparatus according to the embodiment will be described with reference to FIGS. 1 to 11.

[Configuration of Flow-Rate Measuring Apparatus]

FIG. 1 is a block diagram illustrating a configuration of a flow-rate measuring apparatus 1 according to an embodiment. The flow-rate measuring apparatus 1 is provided with a controller circuit 11, a transmitter circuit 12, a receiver circuit 13, a switch circuit 14, an input device 15, and a display device 16.

The controller circuit 11 controls other components of the flow-rate measuring apparatus 1, and executes a flow-rate measurement process, which will be described later with reference to FIG. 2, to measure the flow rate of the fluid 7.

The transmitter circuit 12 generates the first measurement signal M1 and the second measurement signal M2 under the control of the controller circuit 11. The first measurement signal M1 is generated, for example, so as to have a plurality of frequencies (first frequencies). The first measurement signal M1 may has continuous frequencies or discrete frequencies over a certain frequency bandwidth. The first measurement signal M1 may have, for example, a frequency varying with respect to time from the head portion thereof, and may be, for example, a chirp signal (sweep signal). The measurement signal may include a partial time interval having a constant frequency, for example, at the head portion thereof. The second measurement signal M2 is generated so as to have a single frequency (second frequency). The generated first measurement signal M1 and second measurement signal M2 are passed to the transducers 2 to 4 via the switch circuit 14, and further passed to the controller circuit 11.

The receiver circuit 13 is connected to the transducers 2, 3, and 5 via the switch circuit 14. The receiver circuit 13 obtains the first measurement signal M1 transmitted by one of the transducers 2 and 3 and received by the other of the transducers 2 and 3. In addition, the receiver circuit 13 also obtains the second measurement signal M2 transmitted by the transducer 4 and received by the transducer 5.

The switch circuit 14 includes switches 14a to 14d. The switch circuit 14 connects the transmitter circuit 12 to one of the transducers 2 and 3, and connects the receiver circuit 13 to the other of the transducers 2 and 3, under the control of the controller circuit 11. In this case, the transducers 4 and 5 are not connected to the transmitter circuit 12 and the receiver circuit 13. In addition, the switch circuit 14 connects the transmitter circuit 12 to the transducer 4, and connects the receiver circuit 13 to the transducer 5, under the control of the controller circuit 11. In this case, the transducers 2 and 3 are not connected to the transmitter circuit 12 and the receiver circuit 13.

The input device 15 instructs the controller circuit 11 to measure the flow rate of the fluid 7 in response to a user's inputs. The input device 15 includes, for example, a keyboard, a switch, and/or a pointing device.

The display device 16 displays the measured flow rate of the fluid 7.

The pipe 6 may be made of, for example, steel or plastic (for example, Teflon (registered trademark)). The pipe 6 has, for example, an outer diameter of 13 mm and an inner diameter of 8 mm. The pipe 6 may have a smaller size (for example, the outer diameter of 3 mm and the inner diameter of 1.6 mm), and may have a larger size (for example, the outer diameter of 60 mm).

[Operation of Flow-Rate Measuring Apparatus]

Figure 2:
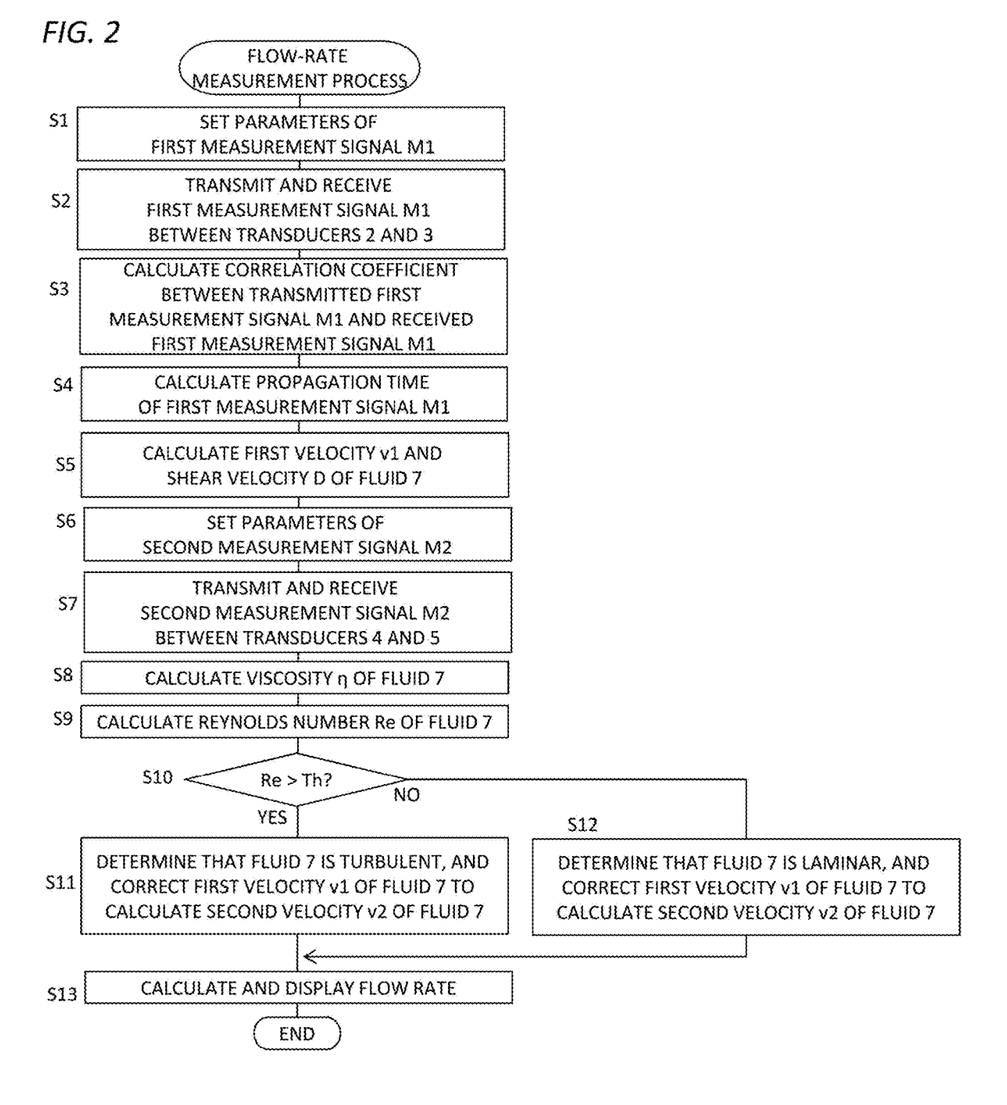
FIG. 2 is a flowchart illustrating a flow-rate measurement process executed by a controller circuit 11 of FIG. 1.

FIG. 2 is a flowchart illustrating a flow-rate measurement process executed by the controller circuit 11 of FIG. 1.

In Step S1, the controller circuit 11 sets parameters of the first measurement signal M1 in the transmitter circuit 12. Here, the parameters of the first measurement signal M1 include the plurality of frequencies (first frequencies) of the first measurement signal M1. When the first measurement signal M1 has continuous frequencies, the parameters of the first measurement signal M1 include a center frequency and a frequency bandwidth of the first measurement signal M1. When the first measurement signal M1 has discrete frequencies, the parameters of the first measurement signal M1 include frequency components included in the first measurement signal M1. The parameters of the first measurement signal M1 may be obtained as the user's inputs via the input device 15, or may be read from a memory (not shown) connected to or built in the controller circuit 11.

In Step S2, the controller circuit 11 controls the switch circuit 14 to transmit a first measurement signal M1 by the transducer 2 and receive the first measurement signal M1 by the transducer 3, and then, transmit a first measurement signal M1 by the transducer 3 and receive the first measurement signal M1 by the transducer 2. The first measurement signal M1 propagates through the fluid 7 inside the pipe 6. The transmitter circuit 12 also passes the transmitted first measurement signal M1 to the controller circuit 11. The receiver circuit 13 passes the received first measurement signal M1 to the controller circuit 11.

Figure 3:
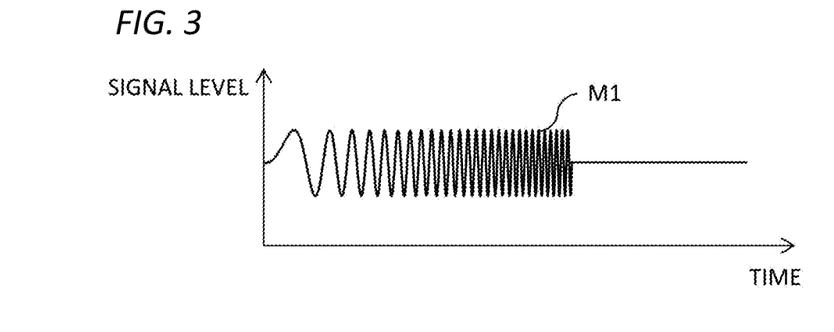
FIG. 3 is a graph illustrating a waveform of an exemplary first measurement signal M1 transmitted and received in Step S2 of FIG. 2.

FIG. 3 is a graph illustrating a waveform of the exemplary first measurement signal M1 transmitted and received in Step S2 of FIG. 2. In the present specification, a case is described where the first measurement signal M1 is a chirp signal (sweep signal) having the frequency varying with respect to time from the head portion thereof. The first measurement signal M1 has a time length of, for example, 20 microseconds. Since the first measurement signal M1 having the plurality of frequencies and the time length is used, the first measurement signal M1 is less likely to be masked by noises as compared with a case of using a single frequency signal or a short signal, and therefore, it is possible to accurately measure the flow rate of the fluid 7.

Figure 4:
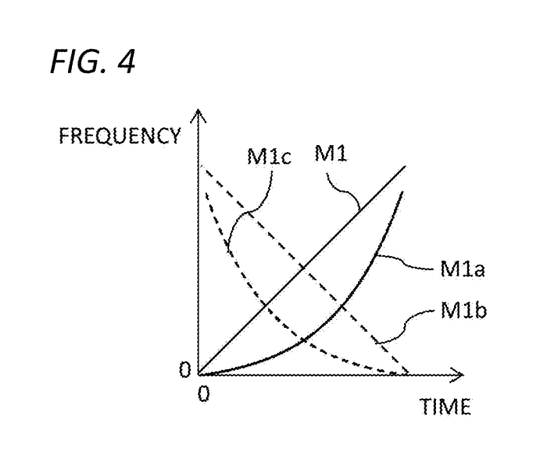
FIG. 4 is a graph illustrating frequency characteristics of the first measurement signal M1 in FIG. 3.

FIG. 4 is a graph illustrating frequency characteristics of the first measurement signal M1 of FIG. 3. The first measurement signal M1 as the chirp signal has the frequency increasing linearly with respect to time from the head portion thereof. Alternatively, measurement signals M1a to M1c illustrated in FIG. 4 may be used. The measurement signal M1a is a chirp signal having a frequency exponentially increasing with respect to time from the head portion thereof. The measurement signal M1b is a chirp signal having a frequency linearly decreasing with respect to time from the head portion thereof. The measurement signal M1c is a chirp signal having a frequency exponentially decreasing with respect to time from the head portion thereof. Not limited to the first measurement signals M1, M1a to M1c illustrated in FIG. 4, any other measurement signal can be used as long as the signal has a plurality of frequencies and a time length. An initial value or a final value of the frequency may be non-zero.

In Step S3 of FIG. 2, the controller circuit 11 calculates a correlation coefficient between a reference signal corresponding to the first measurement signal M1 transmitted by the transducer 2, and the first measurement signal M1 received by the transducer 3, and further calculates a correlation coefficient between a reference signal corresponding to the first measurement signal M1 transmitted by the transducer 3, and the first measurement signal M1 received by the transducer 2. In the example of FIG. 1, the controller circuit 11 uses the measurement signal itself generated by the transmitter circuit 12, as the reference signal. For example, the controller circuit 11 samples the transmitted measurement signal f(x) and the received measurement signal g(x) at discrete times m=1, . . . , M to obtain discretized measurement signals f(m) and g(m). In this case, a correlation coefficient Cor(n) at time moment "n" is calculated, for example, as follows.

[MATHEMATICAL EXPRESSION 1]

$$\text{Cor}(n) = \frac{\sum_{m=1}^{M} f(m-n) \cdot g(m)}{\sqrt{\sum_{m=1}^{M} f^2(m-n)} \cdot \sqrt{\sum_{m=1}^{M} g^2(m)}} \quad (1)$$

The time moment "n" when the correlation coefficient Cor(n) reaches a peak value indicates a moment when the first measurement signal M1 is received.

In Step S4, the controller circuit 11 calculates a propagation time of the first measurement signal M1. Here, the controller circuit 11 calculates a time length T1 from a moment when the transducer 2 transmits the first measurement signal M1, to a moment when the transducer 3 receives the first measurement signal M1 (that is, the moment when the correlation coefficient of the first measurement signal M1 reaches its peak value). In addition, the controller circuit 11 calculates a time length T2 from a moment when the transducer 3 transmits the first measurement signal M1, to a moment when the transducer 2 receives the first measurement signal M1 (that is, the moment when the correlation coefficient of the first measurement signal M1 reaches its peak value).

In Step S5, the controller circuit 11 calculates a first velocity v1 of the fluid 7 based on the propagation time of the first measurement signal M1. In the present specification, the velocity of the fluid 7 calculated without considering the viscosity of the fluid 7 is referred to as the "first velocity v1".

The propagation time T1 of the first measurement signal M1 from the transducer 2 to the transducer 3 is given by T1=L/(c+v1·cos θ), where "v1" denotes the first velocity of the fluid 7, and "c" denotes a sound velocity. In addition, the propagation time T2 of the first measurement signal M1 from the transducer 3 to the transducer 2 is given by T2=L/(c−v1·cos θ). Therefore, the first velocity v1 of the fluid 7 is given as follows.

[MATHEMATICAL EXPRESSION 2]

$$v1 = \frac{L}{2\cos\theta}\left(\frac{1}{T1} - \frac{1}{T2}\right) \quad (2)$$

The first velocity v1 indicates an averaged velocity of the fluid 7 along a propagation path of the first measurement signal M1.

In Step S5, the controller circuit 11 further calculates a shear rate D of the fluid 7 based on the first velocity v1 of the fluid 7.

Figure 5:
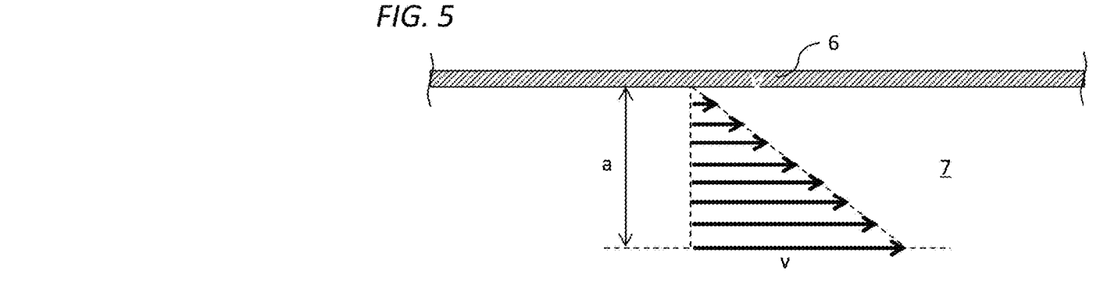
FIG. 5 is a view illustrating calculation of a shear rate D of a fluid 7 in Step S5 of FIG. 2.

FIG. 5 is a view illustrating calculation of the shear rate D of the fluid 7 in Step S5 of FIG. 2. The fluid 7 has a maximum velocity "v" at the center of the pipe 6 (that is, a position at a distance "a" from the inner surface of the pipe 6), and has zero velocity at positions in contact with the inner surface of the pipe 6. In addition, with respect to other positions, the closer to the center of the pipe 6, the faster the fluid 7 flows, on the other hand, the closer to the inner surface of the pipe 6, the slower the fluid 7 flows. In this case, the shear rate D of the fluid 7 is given by D=v/a.

Shear stress τ of the fluid 7 is proportional to the shear rate D, and is given by τ=μ·D. A coefficient μ denotes the viscosity of the fluid 7 associated with the shear stress and the shear rate D, and is also referred to as a "shear viscosity" in the present specification.

In Step S5 of FIG. 2, the first velocity v1 is regarded as the velocity of the fluid 7 at the center of the pipe 6. Therefore, the shear rate D of the fluid 7 is given by D=v1/a.

In Step S6 of FIG. 2, the controller circuit 11 sets parameters of the second measurement signal M2 to the transmitter circuit 12 based on the shear rate D of the fluid 7 (that is, based on the first measurement signal M1). In this case, the parameters of the second measurement signal M2 include a frequency (second frequency) of the second measurement signal M2. The flow-rate measuring apparatus 1 measures a viscosity of the fluid 7 using the second measurement signal M2, as described below. Therefore, the controller circuit 11 determines the optimum frequency for measuring the viscosity of the fluid 7, as the frequency of the second measurement signal M2.

Measuring a viscosity of a fluid using an acoustic signal, such as an ultrasonic wave, is a kind of "dynamic viscoelasticity measurement method". It aims to obtain a viscoelasticity by applying periodic shear deformation to the fluid through vibrations of the acoustic signal, and observing a response thereof "Viscoelasticity" is a combination of "viscosity" and "elasticity". The viscosity is the property that an amount of deformation varies with respect to time under a constant shear stress, as seen in a liquid. The elasticity is the property of deforming under an external force and returning to its original state after removal of the external force, as seen in a solid. A complex elastic modulus G* of a fluid having viscoelasticity is given by G*=Ga+i·Gb, where "i" denotes an imaginary unit, Ga denotes an elastic component of a fluid and is also referred to as "storage elastic modulus", and Gb denotes a viscous component of a fluid and is also referred to as "loss elastic modulus". The loss elastic modulus Gb is proportional to an angular frequency ω of an acoustic signal, and is given by Gb=ω·ηa, where a coefficient ηa denotes a viscosity of the fluid 7 associated with the loss elastic modulus Gb and the angular frequency ω, and is also referred to as "dynamic viscosity" in the present specification.

The complex elastic modulus G* is also considered to be proportional to the angular frequency ω of the acoustic signal in a manner similar to that of the loss elastic modulus Gb, and is given by G*=i·ω·η*, where a coefficient η* is given by η*=ηa−i·ηb, and is also referred to as "complex dynamic viscosity" in the present specification. An imaginary part ηb of the complex dynamic viscosity satisfies Ga=ω·ηb.

When the second measurement signal M2 has a frequency (second frequency) proportional to the shear rate D of the fluid 7, it is possible to obtain the shear viscosity μ of the fluid 7 by measuring the dynamic viscosity η of the fluid 7 using the second measurement signal M2 which is an acoustic signal. Therefore, the controller circuit 11 sets a frequency F=α·D proportional to the shear rate D of the fluid 7, as the frequency of the second measurement signal M2, to the transmitter circuit 12. A proportionality constant α is within, for example, the range of 0.5<α<1.5. For example, when the shear rate D=200, the frequency of the second measurement signal M2 is set to 100 kHz to 300 kHz. The shear rate may vary over time, and the shear rate varies depending on whether the inner surface of the pipe 4 is smooth or rough, and varies depending on whether the flow is laminar or turbulent. Even when such a change in shear rate occurs, it is possible to appropriately set the frequency of the second measurement signal M2. The proportionality constant α may be adjusted by measurement.

In Step S7 of FIG. 2, the controller circuit 11 controls the switch circuit 14 to transmit the second measurement signal M2 having the second frequency by the transducer 4 toward the interface between the pipe 6 and the fluid 7, and receive the second measurement signal M2 reflected at the interface by the transducer 5. The transmitter circuit 12 also passes the transmitted second measurement signal M2 to the controller circuit 11.

Figure 6:
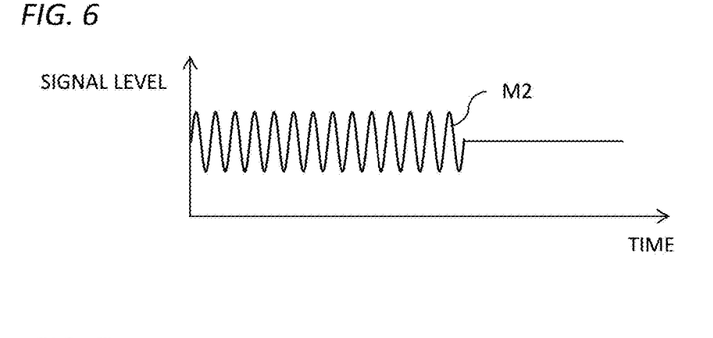
FIG. 6 is a graph illustrating a waveform of an exemplary second measurement signal M2 transmitted and received in Step S7 of FIG. 2.

FIG. 6 is a graph illustrating a waveform of the exemplary second measurement signal M2 transmitted and received in Step S7 of FIG. 2. The second measurement signal M2 contains a single frequency proportional to the shear rate D of the fluid 7.

Figure 7:
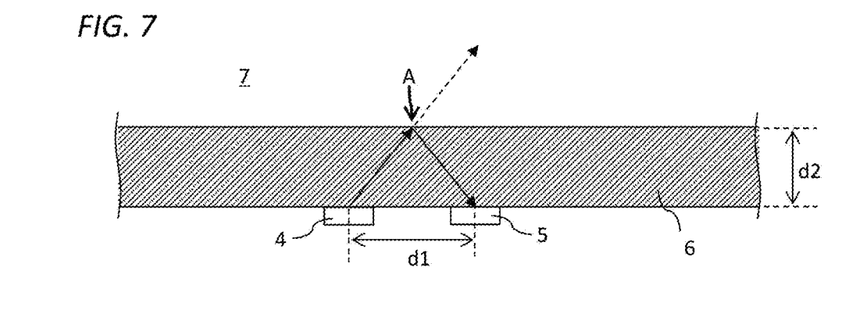
FIG. 7 is a view illustrating a propagation path of the exemplary second measurement signal M2 transmitted and received in Step S7 of FIG. 2.

FIG. 7 is a view illustrating a propagation path of the exemplary second measurement signal M2 transmitted and received in Step S7 of FIG. 2. The second measurement signal M2 is transmitted by the transducer 4, propagates in the pipe 6, is reflected at the interface between the pipe 6 and the fluid 7 (point A in FIG. 6), and then, again propagates in the pipe 6, and is received by the transducer 5.

In Step S8 of FIG. 2, the controller circuit 11 calculates the dynamic viscosity η of the fluid 7 based on the second measurement signal M2 transmitted by the transducer 4, and based on the second measurement signal M2 received by the transducer 5. The controller circuit 11 calculates a reflectance "r" at the interface between the pipe 6 and the fluid 7 based on the second measurement signal M2, and calculates the dynamic viscosity η of the fluid 7 based on the reflectance r. The reflectance r and the dynamic viscosity η are calculated as follows.

The pipe 6 has a density ρ1 and an acoustic impedance Z1, and the fluid 7 has a density ρ2 and an acoustic impedance Z2. In this case, a reflectance coefficient R is given as follows.

[MATHEMATICAL EXPRESSION 3]

$$R^* = \frac{Z2^* - Z1}{Z2^* + Z1} = r \cdot e^{i(\pi - \alpha)} \qquad (3)$$

Where, r denotes the reflectance at the interface between the pipe 6 and the fluid 7 (that is, a ratio of an amplitude of the second measurement signal M2 reflected by the interface, to an amplitude of the second measurement signal M2 incident on the interface), and a denotes a phase shift of the second measurement signal M2 at the interface. The reflectance r and the phase shift a are calculated based on the transmitted second measurement signal M2 and the received second measurement signal M2. In addition, in the present specification, a symbol with the superscript "*" indicates that the quantity represented by the symbol has a complex value, and a symbol without the superscript "*" indicates that the quantity represented by the symbol has a real value. It is assumed that the solid pipe 6 is a perfect elastic body, and the fluid 7 is a viscoelastic body. As a result, in Mathematical Expression (3), the pipe 6 has a real acoustic impedance Z1, and the fluid 7 has a complex acoustic impedance Z2*.

According to the theory of sound wave propagation, an acoustic impedance Z* of a propagation medium satisfies the following relationship with respect to the density p and the complex elastic modulus G* of the propagation medium.

[Mathematical Expression 4]

$$Z^* = \sqrt{\rho \cdot G^*} \quad (4)$$

As described above, if the fluid 7 is a Newtonian fluid, there is no elastic component, and therefore, the complex elastic modulus G* of the fluid 7 is given by $G^* = i \cdot Gb$. Therefore, the acoustic impedance Z2 of the fluid 7 is given as follows by substituting the loss elastic modulus $Gb = \omega \cdot \eta a$ into the right side of Mathematical Expression (4).

[Mathematical Expression 5]

$$Z2 = \sqrt{i \cdot \rho 2 \cdot \omega \cdot \eta a} \quad (5)$$

By substituting Mathematical Expression (5) into Mathematical Expression (3) and reducing it, the dynamic viscosity $\eta a$ is calculated as follows.

[MATHEMATICAL EXPRESSION 6]

$$\eta a = \frac{2 \cdot Z1^2}{\rho 2 \cdot \omega} \left[ \frac{1 - r^2}{1 + r^2 + \sqrt{r^2(6 - r^2) - 1}} \right]^2 \quad (6)$$

Here, the acoustic impedance Z1 of the pipe 6 and the density $\rho 2$ of the fluid 7 are known, and these parameters may be obtained as the user's inputs via the input device 15, or may be read from a memory (not shown) connected to or built in the controller circuit 11. In addition, the angular frequency $\omega$ of the second measurement signal M2 is determined in Step S6. In addition, the reflectance r at the interface between the pipe 6 and the fluid 7 is calculated based on the second measurement signal M2 as described above.

In Step S9, the controller circuit 11 calculates a Reynolds number of the fluid 7 based on the viscosity of the fluid 7. The Reynolds number Re of the fluid 7 is calculated by $Re = \rho 2 \cdot v1 \cdot L / \eta a$, where L denotes a length characterizing a system through which the fluid 7 flows. If the fluid 7 flows through the pipe 6, L may be set to, for example, the diameter $2a$ or radius $a$ of the pipe 6.

In Step S10, the controller circuit 11 determines whether or not the Reynolds number Re is higher than a predetermined threshold Th, thus determining whether the fluid 7 is turbulent or laminar. In this case, if Re>Th, the process proceeds to Step S11, and otherwise, the process proceeds to Step S12. In the case of the pipe 6 having a circular cross section, the threshold Th may be set to, for example, 2300.

Figure 8:
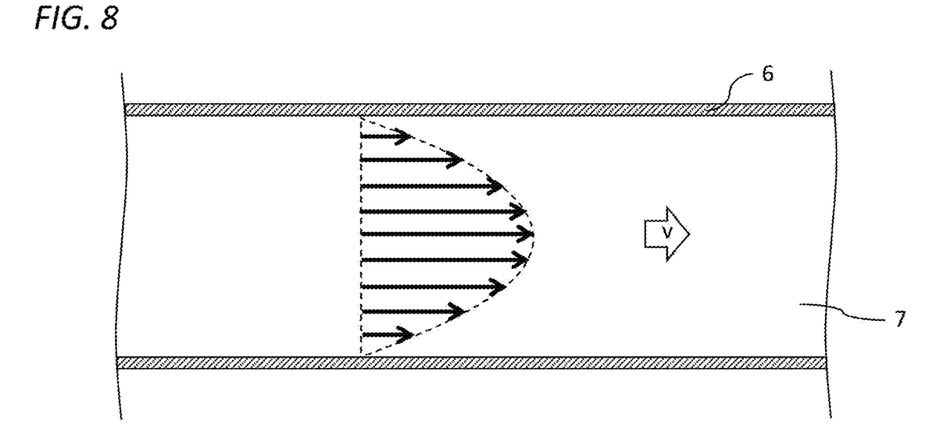
FIG. 8 is a view illustrating an exemplary velocity distribution of the fluid 7 flowing in a laminar flow inside a pipe 6 of FIG. 1.
Figure 9:
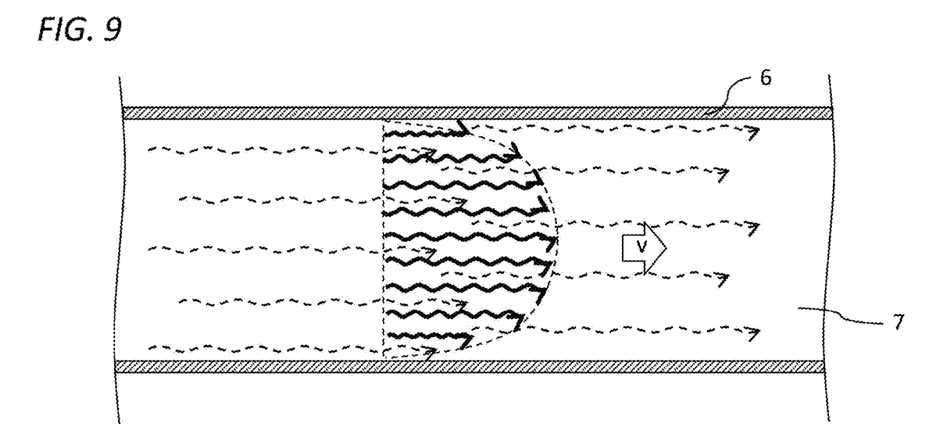
FIG. 9 is a view illustrating an exemplary velocity distribution of the fluid 7 flowing in a turbulent flow inside the pipe 6 of FIG. 1.

FIG. 8 is a view illustrating an exemplary velocity distribution of the fluid 7 flowing in a laminar flow inside the pipe 6 of FIG. 1. FIG. 9 is a view illustrating an exemplary velocity distribution of the fluid 7 flowing in a turbulent flow inside the pipe 6 of FIG. 1. The flow rate of the fluid 7 inside the pipe 6 is calculated by multiplying an average velocity of the fluid 7 across the cross section of the pipe 6, by the cross-sectional area of the pipe 6. However, as described above, the velocity distribution of the fluid 7 across the cross section of the pipe 6 varies depending on the viscosity of the fluid 7. In addition, the velocity distribution of the fluid 7 across the cross section of the pipe 6 varies also depending on the density of the fluid 7, the velocity of the fluid 7, and dimensions of the pipe 6. For example, when the fluid 7 flows in a laminar flow, the fluid 7 has a parabolic velocity distribution such that the closer to the center of the pipe 6, the faster the fluid 7 flows, on the other hand, the closer to the inner surface of the pipe 6, the slower the fluid 7 flows. On the other hand, when the fluid 7 flows in a turbulent flow, the fluid 7 is mixed by a large disturbance, and therefore, the velocity of the fluid 7 as a whole is more homogenized than that of the laminar flow. In this way, the velocity distribution of the fluid 7 across the cross section of the pipe 6 varies depending on whether the fluid 7 is turbulent or laminar, and thus, the average velocity of the fluid 7 across the cross section of the pipe 6 also varies.

The first velocity v1 calculated in Step S5 is not the average velocity of the fluid 7 across the cross section of the pipe 6, but represents the average velocity of the fluid 7 along the propagation path of the first measurement signal M1 as described above. Therefore, in order to calculate an accurate flow rate of the fluid 7, the controller circuit 11 calculates a correction coefficient which differs depending on whether the fluid 7 is turbulent or laminar, and multiplies the first velocity v1 by the correction coefficient, thus calculating an average velocity (second velocity v2) of the fluid 7 across the cross section of the pipe 6.

In Step S11, the controller circuit 11 determines that the fluid 7 flows in a turbulent flow, and calculates a correction coefficient kt of the turbulent flow, and corrects the first velocity v1 of the fluid 7 using the turbulent correction coefficient kt to calculate the second velocity v2 of the fluid 7 (v2=v1/kt). The turbulent correction coefficient kt can be calculated in various ways according to mathematical models representing the turbulent flow, and for example, may be calculated as follows.

$$kt = 1 + 0.01 \sqrt{6.25 + 431 \cdot Re^{-0.237}} \quad \text{[Mathematical Expression 7]}$$

$$kt = 1.119 - 0.011 \cdot \log Re \quad \text{[Mathematical Expression 8]}$$

In Step S12, the controller circuit 11 determines that the fluid 7 flows in a laminar flow, and calculates a correction coefficient kl of the laminar flow, and corrects the first velocity v1 of the fluid 7 using the laminar correction coefficient kl to calculate the second velocity v2 of the fluid 7 (v2=v1/kl). When the fluid 7 flows in a laminar flow, the first velocity v1 measured using the first measurement signal M1 is ⅔ of the maximum velocity of the fluid 7 across the cross section of the pipe 6. In addition, when the fluid 7 flows in a laminar flow, the average velocity of the fluid 7 across the cross section of the pipe 6 is ½ of the maximum velocity of the fluid 7 across the cross section of the pipe 6. Therefore, the laminar correction coefficient kl is given by kl=4/3.

In this manner, the controller circuit 11 calculates the second velocity of the fluid 7 by multiplying the first velocity of the fluid 7 by the laminar correction coefficient kl or the turbulent correction coefficient kt. In other words, the controller circuit 11 calculates the second velocity v2 of the fluid 7 by correcting the first velocity v1 of the fluid 7 based on the Reynolds number Re of the fluid 7 (that is, based on the dynamic viscosity $\eta a$ of the fluid 7).

In Step S13, the controller circuit 11 calculates the flow rate of the fluid 7 inside the pipe 6 based on the second velocity v2, and displays the flow rate of the fluid 7 on the display device 16. It is represented by the product of the cross-sectional area of the pipe 6 and the second velocity v2 of the fluid 7. Therefore, in the example of FIG. 1, a flow rate Q of the fluid 7 is given by $Q = \pi \cdot a^2 \cdot v2$.

In this manner, the controller circuit 11 calculates the flow rate of the fluid 7 inside the pipe 6 so as to reflect the viscosity of the fluid 7 based on the first measurement signal M1 and the second measurement signal M2.

Modifications of Embodiment

Figure 10:
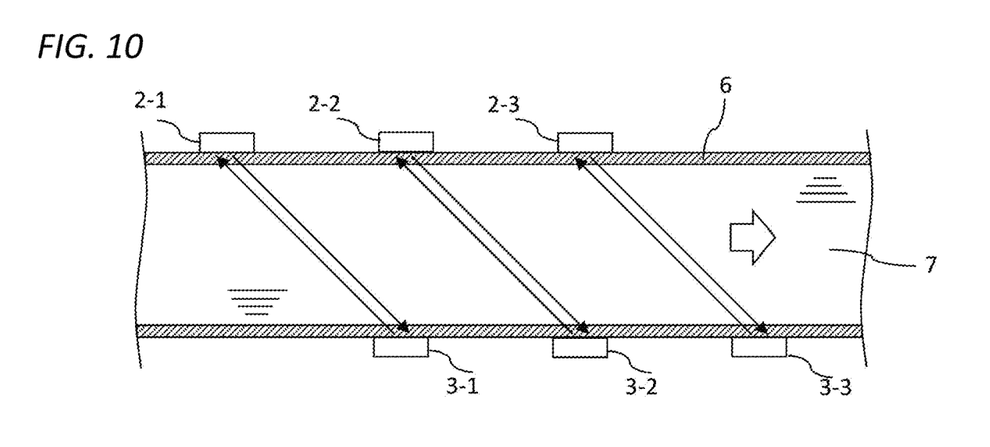
FIG. 10 is a view illustrating an arrangement of transducers 2-1 to 2-3 and 3-1 to 3-3 used by a flow-rate measuring apparatus according to a first modification of the embodiment.

FIG. 10 is a view illustrating an arrangement of transducers 2-1 to 2-3 and 3-1 to 3-3 used by a flow-rate measuring apparatus according to a first modification of the embodiment. The flow-rate measuring apparatus may transmit and receive a first measurement signal M1 between each pair of a plurality of pairs of transducers 2-1 to 2-3 and 3-1 to 3-3 to calculate each flow rate of a fluid 7, and calculate an average of a plurality of calculated flow rates. As a result, it is possible to more accurately calculate the flow rate of the fluid 7 than the case of using only one pair of transducers 2 and 3.

Figure 11:
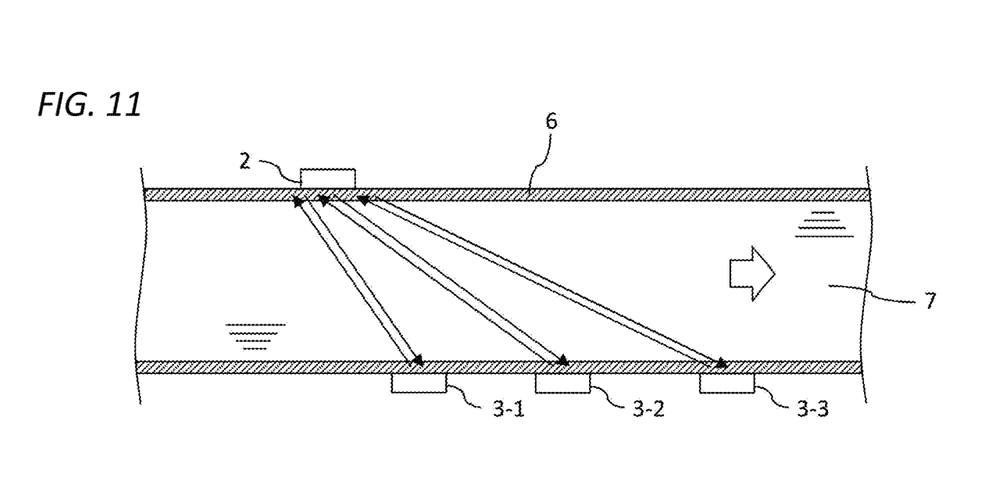
FIG. 11 is a view illustrating an arrangement of transducers 2, 3-1 to 3-3 used by a flow-rate measuring apparatus according to a second modification of the embodiment.

FIG. 11 is a view illustrating an arrangement of transducers 2, 3-1 to 3-3 used by a flow-rate measuring apparatus according to a second modification of the embodiment. The flow-rate measuring apparatus may transmit and receive a first measurement signal M1 between the transducers 2 and 3-1, transmit and receive a first measurement signal M1 between the transducers 2 and 3-2, transmit and receive a first measurement signal M1 between the transducers 2 and 3-3, calculate flow rates of the fluid 7 based on these first measurement signals M1, respectively, and calculate an average of the calculated flow rates. As a result, it is possible to more accurately calculate the flow rate of the fluid 7 than the case of using only one pair of transducers 2 and 3.

Figure 12:
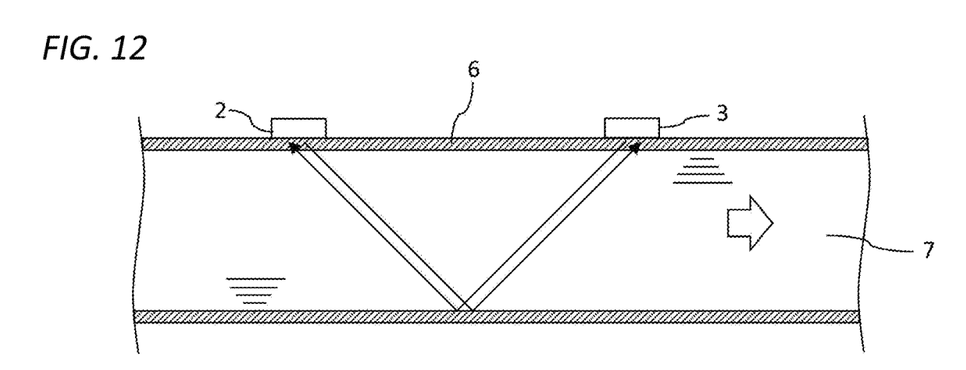
FIG. 12 is a view illustrating another arrangement of transducers 2 and 3 used by a flow-rate measuring apparatus according to a third modification of the embodiment.

FIG. 12 is a view illustrating another arrangement of transducers 2 and 3 used by a flow-rate measuring apparatus according to a third modification of the embodiment. The transducers 2 and 3 may be arranged such that a first measurement signal M1 transmitted by one transducer is reflected at least once by the inner surface of the pipe 6 before being received by the other transducer. If the fluid 7 does not flow in parallel to the longitudinal direction of the pipe 6 and has a radial velocity component, then an error occurs. In this case, by arranging the transducers 2 and 3 as illustrated in FIG. 12, it is possible to cancel the velocity components of the fluid 7 in the radial direction of the pipe 6, and therefore, an error is less likely to occur. In addition, by arranging the transducers 2 and 3 as illustrated in FIG. 12, it is possible to increase a path length of the first measurement signal M1 propagating in the fluid 7. As a result, it is possible to more accurately calculate a propagation time of the first measurement signal M1, and therefore, more accurately calculate the flow rate of the fluid 7.

Figure 13:
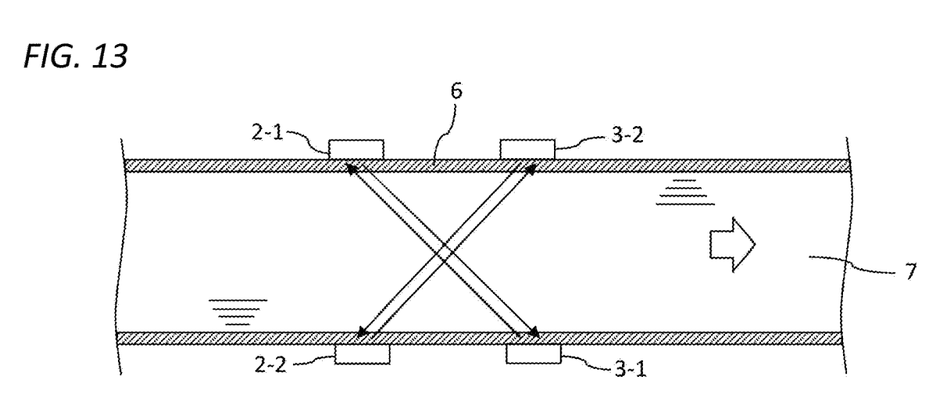
FIG. 13 is a view illustrating an arrangement of transducers 2-1, 2-2, 3-1, and 3-2 used by a flow-rate measuring apparatus according to a fourth modification of the embodiment.

FIG. 13 is a view illustrating an arrangement of transducers 2-1, 2-2, 3-1, and 3-2 used by a flow-rate measuring apparatus according to a fourth modification of the embodiment. The transducers 2-1, 2-2, 3-1, and 3-2 may be arranged such that a path of a first measurement signal M1 between the transducers 2-1 and 3-1 intersects a path of a first measurement signal M1 between the transducers 2-2 and 3-2. Spatial limitations may prevent the arrangement of the transducers 2 and 3 as illustrated in FIG. 12. In this case, by arranging the transducers 2-1, 2-2, 3-1, and 3-2 as illustrated in FIG. 13, it is possible to cancel the velocity components of the fluid 7 in the radial direction of the pipe 6, and therefore, an error is less likely to occur, in a manner similar to that of FIG. 12.

Figure 14:
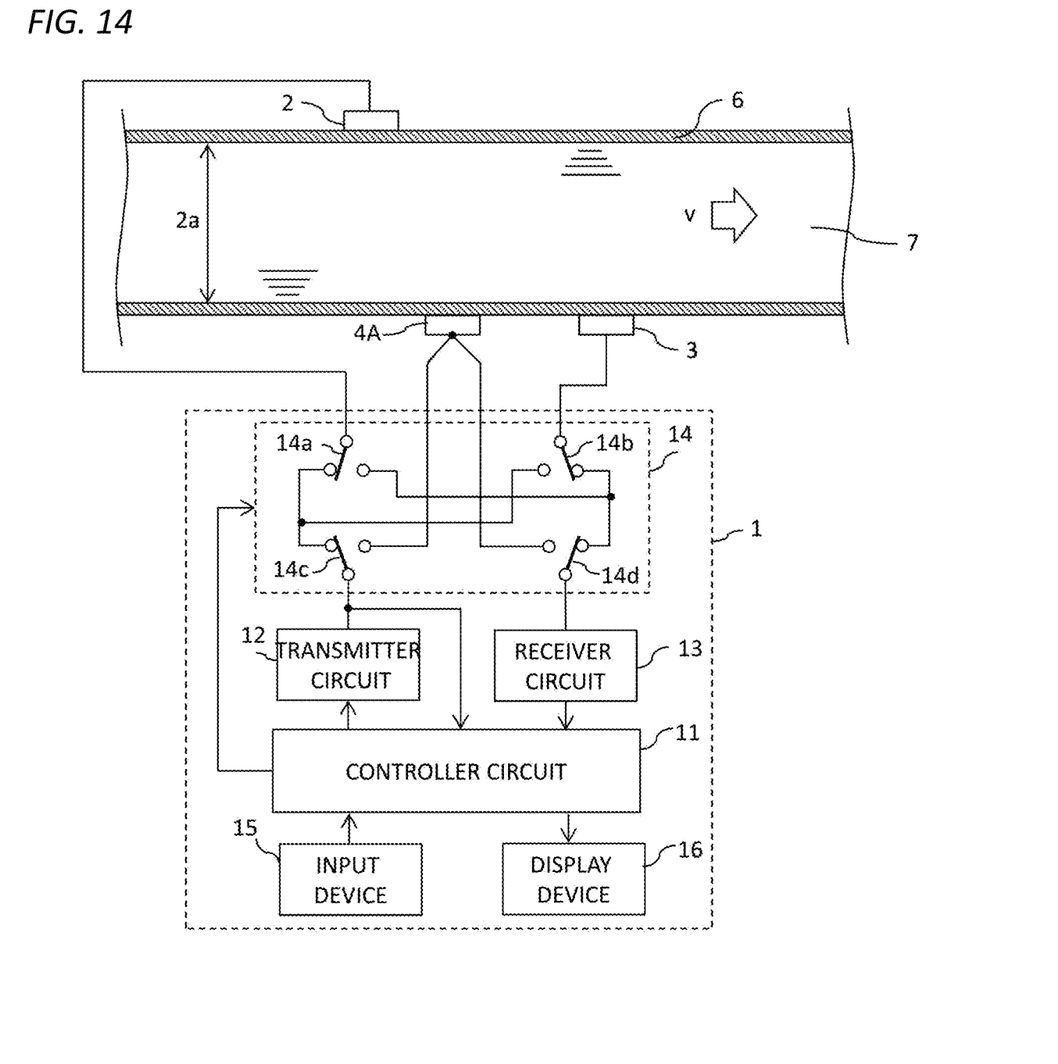
FIG. 14 is a view illustrating an arrangement of transducers 2, 3, and 4A used by a flow-rate measuring apparatus 1 according to a fifth modification of the embodiment.

FIG. 14 is a view illustrating an arrangement of transducers 2, 3, and 4A used by a flow-rate measuring apparatus 1 according to a fifth modification of the embodiment. The flow-rate measuring apparatus 1 may be connected to one transducer 3A that operates as both the transducer 4 (third transducer) and the transducer 5 (fourth transducer) of FIG. 1. As a result, it is possible to measure the flow rate of the fluid 7 using a smaller number of the transducers 2, 3, and 4A than that of FIG. 1, and reduce the time and effort for arranging the transducers in the pipe 6.

Figure 15:
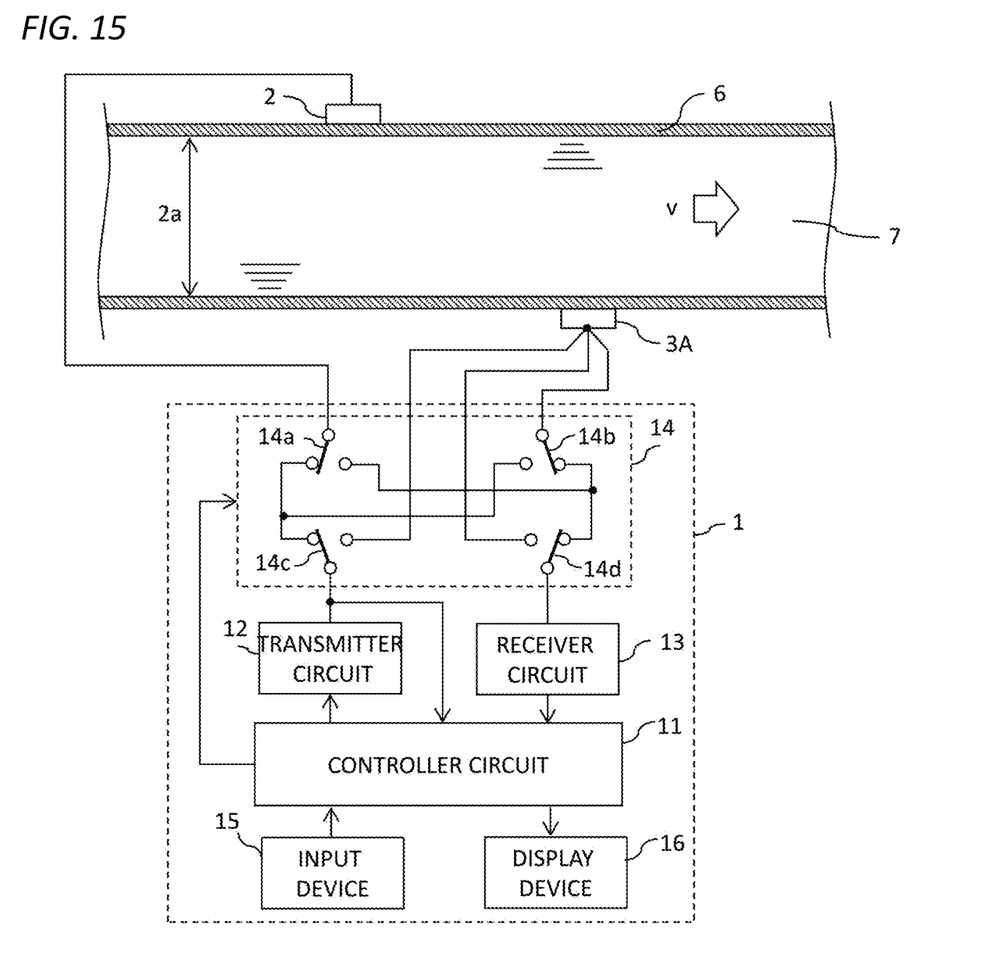
FIG. 15 is a view illustrating an arrangement of transducers 2 and 3A used by a flow-rate measuring apparatus 1 according to a sixth modification of the embodiment.

FIG. 15 is a view illustrating an arrangement of transducers 2 and 3A used by a flow-rate measuring apparatus 1 according to a sixth modification of the embodiment. The flow-rate measuring apparatus 1 may be connected to one transducer 3A that operates as the transducer 3 (second transducer), the transducer 4 (third transducer), and the transducer 5 (fourth transducer) of FIG. 1. Similarly, the flow-rate measuring apparatus 1 may be connected to one transducer that operates as the transducer 2 (first transducer), the transducer 4 (third transducer), and the transducer 5 (fourth transducer) of FIG. 1. As a result, it is possible to measure the flow rate of the fluid 7 using a smaller number of the transducers 2 and 3A than that of FIGS. 1 and 14, and reduce the time and effort for arranging the transducers in the pipe 6.

The flow-rate measuring apparatus 1 of FIG. 1 may repeatedly transmit and receive measurement signals between one pair of transducers 2 and 3, calculate flow rates of the fluid 7 based on these measurement signals, respectively, and calculate an average of the calculated flow rates. As a result, it is possible to more accurately calculate the flow rate of the fluid 7.

As described above, the reference signal for calculating the correlation coefficient may be the measurement signal itself generated by the transmitter circuit 12.

The reference signal for calculating the correlation coefficient may be generated by adjusting at least partial frequency components of the measurement signal generated by the transmitter circuit 12, in consideration of the frequency characteristics of the transducers 2 and 3. Due to the frequency characteristics of the transducers 2 and 3, the waveform of the electrical signal inputted from the transmitter circuit 12 to the transducers 2 and 3 differs from the waveform of the acoustic signal outputted from the transducers 2 and 3. Similarly, the waveform of the acoustic signal inputted to the transducers 2 and 3 differs from the waveform of the electrical signal inputted from the transducers 2 and 3 to the receiver circuit 13. For example, the reference signal may be generated by emphasizing frequency components near a resonance frequency of the transducers 2 and 3, among the plurality of frequency components of the measurement signal generated by the transmitter circuit 12.

The reference signal for calculating the correlation coefficient may be generated by monitoring the acoustic signal each time the transducers 2 and 3 output the acoustic signal.

The reference signal for calculating the correlation coefficient may be generated by averaging several acoustic signals outputted from the transducers 2 and 3. Alternatively, the reference signal for calculating the correlation coefficient may be generated by monitoring the acoustic signal inputted to the transducers 2 and 3 in an ideal state. Monitoring the measurement signal (electrical signal or acoustic signal) each time the transmitter circuit 12 generates the measurement signal leads to improved accuracy, but has a problem of increased processing load. Therefore, in order to reduce the processing load, the correlation coefficient may be calculated using a predetermined reference signal, such as the averaged acoustic signal or the ideal acoustic signal.

Advantageous Effects of Embodiment

According to the flow-rate measuring apparatus 1 of the embodiment, it is possible to accurately measure the flow rate of the fluid 7 with reflecting the viscosity of the fluid 7, without requiring a pipe having a special shape, and without requiring a predetermined table indicating relationships among the viscosity and other parameters.

In addition, according to the flow-rate measuring apparatus 1 of the embodiment, it is possible to accurately measure the first velocity v1 using the first measurement signal M1 having a wide bandwidth, such as the chirp signal, and therefore, accurately measure the flow rate of the fluid 7.

In addition, according to the flow-rate measuring apparatus 1 of the embodiment, it is possible to accurately measure the dynamic viscosity ηa by determining the frequency of the second measurement signal M2 based on the first measurement signal M1, so that the frequency is optimal for measuring the dynamic viscosity ηa, and therefore, accurately measure the flow rate of the fluid 7.

OTHER EMBODIMENTS

The first measurement signal M1 is not limited to the chirp signal, but may be any other signal as long as the first velocity v1 and the shear rate D of the fluid 7 (thus, the second frequency of the second measurement signal M2) can be determined. The first measurement signal M1 may have a single frequency.

FIG. 2 illustrates the case where the flow rate of the fluid 7 is calculated based on the propagation time of the first measurement signal M1, but alternatively, the flow rate of the fluid 7 may be calculated based on a Doppler shift occurring in the first measurement signal M1. Let fa be a frequency of the transmitted first measurement signal M1, and let fb be a frequency of the received first measurement signal M1. The frequency fb is given by fb=fa×(c+v·cos θ)/(c−v·cos θ). The velocity v of the fluid 7 is given by v=c/(2 cos θ)·(fb−fa)/fb. Therefore, in the example of FIG. 1, a flow rate Q of the fluid 7 is given by Q=π·r2·v. In this case, the first measurement signal M1 may be transmitted in only one direction between the transducers 2 and 3. Even when the first measurement signal M1 has a plurality of frequencies, the flow rate of the fluid 7 can be calculated in substantially the same manner as described above.

Although the case has been described herein where the fluid 7 is the Newtonian fluid, the flow rate of the fluid 7 can be calculated using a suitable model even when the fluid 7 is a non-Newtonian fluid. The non-Newtonian fluid is a liquid whose viscosity varies depending on the shear rate D, and for example, includes ink, molten resin, and the like. In the case of the non-Newtonian fluid, the shear rate D is an important parameter for measuring the flow rate, unlike the case of the Newtonian fluid. In addition, it should be noted that the non-Newtonian fluid has the elasticity as well as the viscosity, but the elasticity is ignored in Mathematical Expression (6).

Summary of Embodiments

The flow-rate measuring apparatus according to aspects of the present disclosure may be expressed as follows.

According to a flow-rate measuring apparatus of a first aspect of the present disclosure, a flow-rate measuring apparatus 1 it provided for measuring a flow rate of a fluid 7 inside a pipe 6 having a predetermined cross-sectional area. The flow-rate measuring apparatus 1 is connected to first to fourth transducers 2 to 5 provided on the pipe 6, the first and third transducers 2 and 4 converting electrical signals into acoustic signals, the second and fourth transducers 3 and 5 converting acoustic signals into electrical signals. The flow-rate measuring apparatus 1 is configured to transmit a first measurement signal having at least one first frequency by the first transducer 2, and receive the first measurement signal by the second transducer 3 through the fluid 7 inside the pipe 6. The flow-rate measuring apparatus 1 is further configured to determine a second frequency based on the first measurement signal. The flow-rate measuring apparatus 1 is further configured to transmit a second measurement signal having the second frequency by the third transducer 4 toward an interface between the pipe 6 and the fluid 7, and receive the second measurement signal reflected at the interface by the fourth transducer 4. The flow-rate measuring apparatus 1 is further configured to calculate the flow rate of the fluid 7 inside the pipe 6 so as to reflect a viscosity of the fluid 7 based on the first and second measurement signals.

According to a flow-rate measuring apparatus of a second aspect of the present disclosure, in the flow-rate measuring apparatus of the first aspect, the flow-rate measuring apparatus 1 is further configured to calculate a first velocity of the fluid 7 based on the first measurement signal. The flow-rate measuring apparatus 1 is further configured to calculate a shear rate of the fluid 7 based on the first velocity of the fluid 7. The flow-rate measuring apparatus 1 is further configured to determine the second frequency so as to be proportional to the shear rate of the fluid 7.

According to a flow-rate measuring apparatus of a third aspect of the present disclosure, in the flow-rate measuring apparatus of the first or second aspect, the flow-rate measuring apparatus 1 is further configured to calculate a first velocity of the fluid 7 based on the first measurement signal. The flow-rate measuring apparatus 1 is further configured to calculate a reflectance at the interface between the pipe 6 and the fluid 7 based on the second measurement signal, and calculate the viscosity of the fluid 7 based on the reflectance. The flow-rate measuring apparatus 1 is further configured to correct the first velocity of the fluid 7 based on the viscosity of the fluid 7 to calculate a second velocity of the fluid 7. The flow-rate measuring apparatus 1 is further configured to calculate the flow rate of the fluid 7 inside the pipe 6 based on the second velocity.

According to a flow-rate measuring apparatus of a fourth aspect of the present disclosure, in the flow-rate measuring apparatus of the third aspect, the flow-rate measuring apparatus 1 is further configured to calculate a Reynolds number of the fluid 7 based on the viscosity of the fluid 7. The flow-rate measuring apparatus 1 is further configured to determine whether the fluid 7 is laminar or turbulent, based on the Reynolds number. The flow-rate measuring apparatus 1 is further configured to calculate the second velocity of the fluid 7 by multiplying the first velocity of the fluid 7 by a correction coefficient of a laminar flow or a correction coefficient of a turbulent flow.

According to a flow-rate measuring apparatus of a fifth aspect of the present disclosure, in the flow-rate measuring apparatus of any one of the first to fourth aspects, the first measurement signal has a plurality of frequencies, and the second measurement signal has a single frequency.

According to a flow-rate measuring apparatus of a sixth aspect of the present disclosure, in the flow-rate measuring apparatus of the fifth aspect, the first measurement signal has a frequency varying with respect to time from a head portion of the first measurement signal.

According to a flow-rate measuring apparatus of a seventh aspect of the present disclosure, in the flow-rate measuring apparatus of any one of the first to sixth aspects, the flow-rate measuring apparatus 1 is connected to one transducer that operates as the third and fourth transducers.

According to a flow-rate measuring apparatus of an eighth aspect of the present disclosure, in the flow-rate measuring apparatus of the seventh aspect, the flow-rate measuring apparatus is connected to one transducer that operates as the first, third, and fourth transducers.

INDUSTRIAL APPLICABILITY

According to the present disclosure, a flow-rate measuring apparatus 1 is provided, which measures a flow rate of a fluid inside a pipe having a predetermined cross-sectional area, and which is capable of accurately measuring the flow rate of the fluid with reflecting the viscosity of the fluid.

REFERENCE SIGNS LIST

1: FLOW-RATE MEASURING APPARATUS
2, 2-1 to 2-3, 3, 3-1 to 3-3, 4, 5: TRANSDUCER
6: PIPE
7: FLUID
11: CONTROLLER CIRCUIT
12: TRANSMITTER CIRCUIT
13: RECEIVER CIRCUIT
14: SWITCH CIRCUIT
15: INPUT DEVICE
16: DISPLAY DEVICE

The invention claimed is:

1. A flow-rate measuring apparatus for measuring a flow rate of a fluid inside a pipe having a predetermined cross-sectional area,
wherein the flow-rate measuring apparatus is connected to first to fourth transducers provided on the pipe, the first and third transducers converting electrical signals into acoustic signals, the second and fourth transducers converting acoustic signals into electrical signals,
wherein the flow-rate measuring apparatus is configured to:
transmit a first measurement signal having at least one first frequency by the first transducer, and receive the first measurement signal by the second transducer through the fluid inside the pipe;
determine a second frequency based on the first measurement signal;
transmit a second measurement signal having the second frequency by the third transducer toward an interface between the pipe and the fluid, and receive the second measurement signal reflected at the interface by the fourth transducer; and
calculate the flow rate of the fluid inside the pipe so as to reflect a viscosity of the fluid based on the first and second measurement signals,
wherein the flow-rate measuring apparatus is further configured to:
calculate a first velocity of the fluid based on the first measurement signal;
calculate a shear rate of the fluid based on the first velocity of the fluid; and
determine the second frequency so as to be proportional to the shear rate of the fluid.

2. The flow-rate measuring apparatus according to claim 1,
wherein the flow-rate measuring apparatus is configured to:
calculate a reflectance at the interface between the pipe and the fluid based on the second measurement signal, and calculate the viscosity of the fluid based on the reflectance;
correct the first velocity of the fluid based on the viscosity of the fluid to calculate a second velocity of the fluid; and
calculate the flow rate of the fluid inside the pipe based on the second velocity.

3. The flow-rate measuring apparatus according to claim 2,
wherein the flow-rate measuring apparatus is configured to:
calculate a Reynolds number of the fluid based on the viscosity of the fluid;
determine whether the fluid is laminar or turbulent, based on the Reynolds number; and
calculate the second velocity of the fluid by multiplying the first velocity of the fluid by a correction coefficient of a laminar flow or a correction coefficient of a turbulent flow.

4. The flow-rate measuring apparatus according to claim 1,
wherein the first measurement signal has a plurality of frequencies, and
wherein the second measurement signal has a single frequency.

5. The flow-rate measuring apparatus according to claim 4,
wherein the first measurement signal has a frequency varying with respect to time from a head portion of the first measurement signal.

6. The flow-rate measuring apparatus according to claim 1,
wherein the flow-rate measuring apparatus is connected to one transducer that operates as the third and fourth transducers.

7. The flow-rate measuring apparatus according to claim 6,
wherein the flow-rate measuring apparatus is connected to one transducer that operates as the first, third, and fourth transducers.

* * * * *